April 6, 1948.    N. O. BRANTLY    2,439,234
APPARATUS FOR CONTOURING METAL
Filed Feb. 27, 1943    3 Sheets-Sheet 1
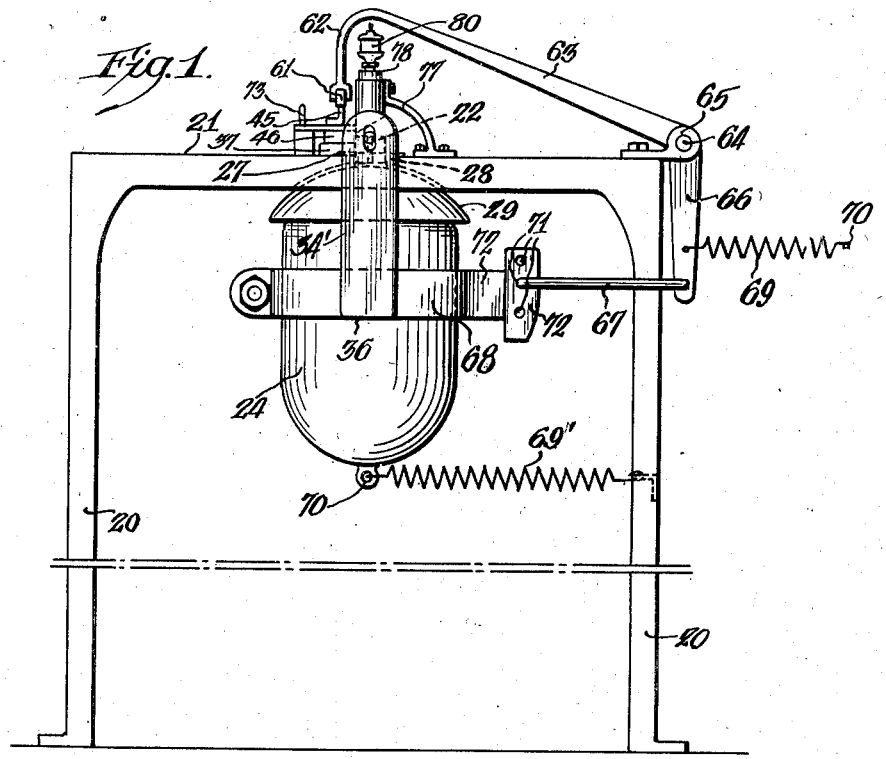
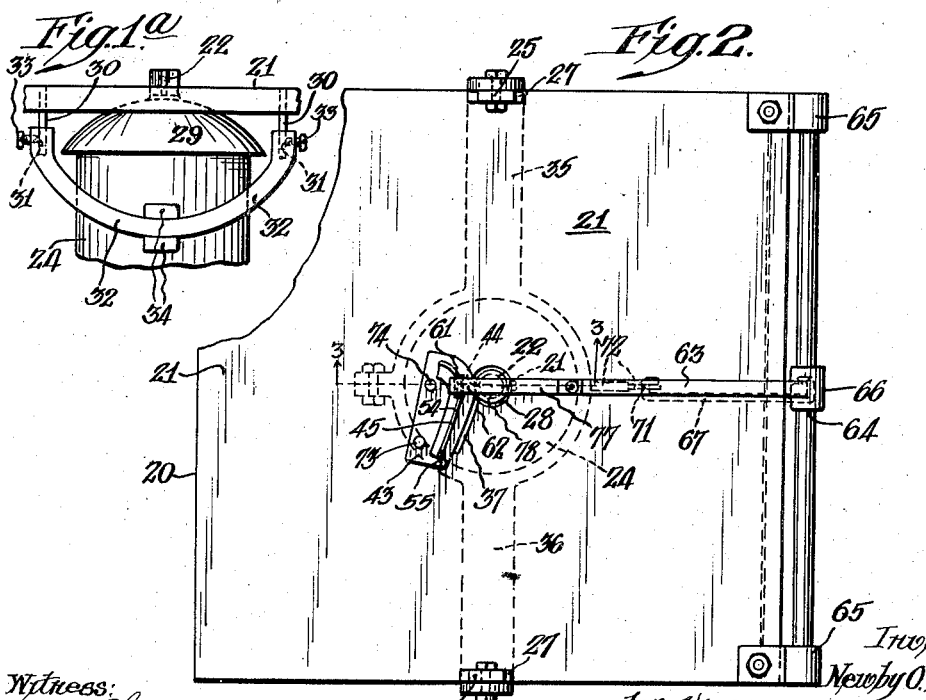

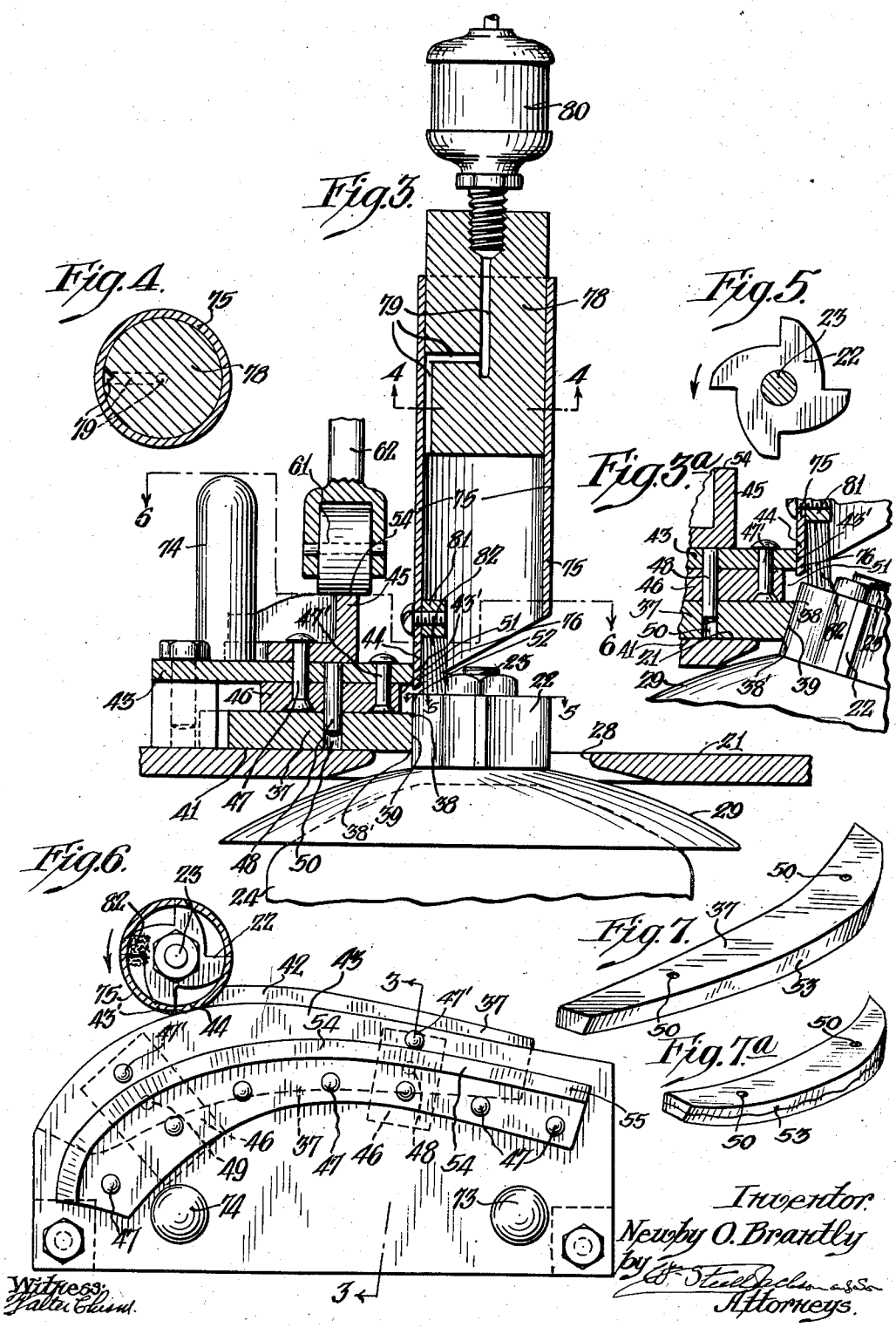

April 6, 1948. N. O. BRANTLY 2,439,234
APPARATUS FOR CONTOURING METAL
Filed Feb. 27, 1943 3 Sheets-Sheet 3
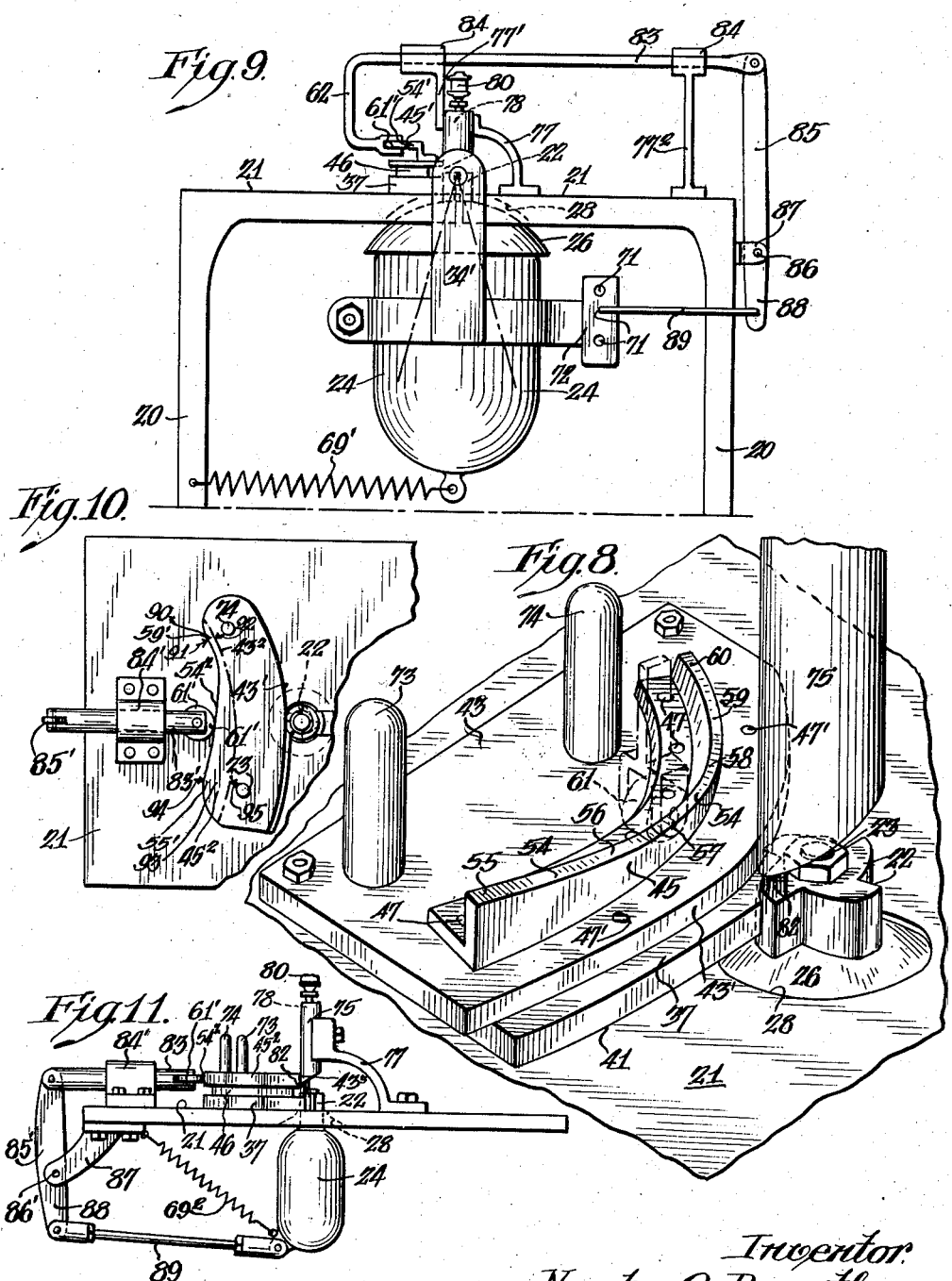
Inventor:
Newby O. Brantly Patented Apr. 6, 1948

2,439,234

UNITED STATES PATENT OFFICE 2,439,234

APPARATUS FOR CONTOURING METAL

Newby O. Brantly, Mount Holly, N. J., assignor to Kite Aircraft Corporation, Philadelphia, Pa., a corporation of Pennsylvania Application February 27, 1943, Serial No. 477,401

5 Claims. (Cl. 90—13)

My invention relates to mechanism for cutting contours.

A purpose of the invention is to cut an edge or surface contour in accordance with a pattern different from the contour cut.

A further purpose is to determine the general path of the edge of the work by a pattern which outlines the profile, and concurrently to determine the angle which the edge cut makes to a surface of the work by a form which automatically tilts the cutting tool about an axis.

A further purpose is to cut the profile of a work piece by a rotary tool driven by a motor and concurrently to tilt the motor about an axis progressively as the cutting proceeds along the edge of the profile, using a track to determine the extent of tilt of the motor.

A further purpose is to use a flat surface, present or supplied, to support the work while it is fed along a flat table surface, and progressively and automatically to tilt a cutting tool so that the cut made lies at different angles with the surface of the work, determining the changes in the tilt of the cutting tool by a track which permissibly may vary either in a plane perpendicular to the cutting table or at any desired angle thereto.

A further purpose is to fasten a piece to be contoured to a lateral profile guide which determines the general outline of the edge being cut but is spaced from it and to mount a track upon the piece rigidly with respect to the profiling guide and by it automatically to tilt the cutting tool as the piece progresses past the cutting tool.

A further purpose is to mount a profiling guide upon a piece to be cut, use the piece to define the plane path of travel, move the piece past the cutting tool while the guide is spaced uniformly with respect to the cutting tool by engagement of the guide with a bodily fixed member in proper position with respect to the cutting tool, thus progressively determining the depth to which the cutting tool cuts and the path along which the piece cut travels, and at the same time to carry along with the guide and piece a second guide for tilting the cutting tool.

A further purpose is to support a cutting tool shaft carrying a tool from an axis approximately at a level with a surface of a work sheet or plate to be contoured and at the edge cut, to tilt the axis of the driving shaft for the cutting tool about this tilting axis according to the projection or retraction of a track which progresses with the material cut.

Further purposes will appear in the specification and in the claims.

I have preferred to illustrate my invention by a single type only, selecting a form which is practical, effective, reliable and inexpensive and at the same time well illustrates the principles involved.

Figure 1 is a side elevation of the structure embodying my invention.

Figure 1ᵃ is a fragmentary view of Figure 1 showing a slightly different means of support for tilting purposes.

Figure 2 is a fragmentary top plan showing the invention seen in Figure 1.

Figure 3 is a section of Figure 2 taken upon line 3—3.

Figure 3ᵃ is a fragmentary view showing parts in Figure 3 in a tilted position.

Figure 4 is a section of Figure 3 taken upon line 4—4.

Figure 5 is a fragmentary section of Figure 3 taken upon line 5—5.

Figure 6 is a top plan view of the structure seen in Figure 3 partly sectioned.

Figure 7 is a perspective view of one of the work pieces used as illustrations.

Figure 7ᵃ is a reduced perspective view showing a work piece having an irregular lower surface to which has been applied a plane feeding surface.

Figure 8 is a fragmentary perspective view showing the parts in Figure 1.

Figure 9 is an elevation similar to Figure 1 but showing a slightly different form.

Figure 10 is a fragmentary top plan view on reduced scale showing a variant form of track to determine the angle of cut.

Figure 11 is a reduced scale side elevation showing the structure of Figure 10.

In the drawings similar numerals indicate like parts.

One of the types of work upon which the present invention has been used successfully and which well illustrates the adaptability and flexibility of my invention is the cutting of ribs which space and stiffen the top and bottom surfaces of an airplane wing at and near the edge of the wing. These ribs are much longer than they are wide, are preferably made from a flat sheet of metal, thus having parallel sides, of a freely cutting light weight metal such as aluminum or a light metal alloy, and in use extend transversely of the wing between the upper and lower bounding surfaces of the plane wings and accommodate along their lengths and in their changing face angles to the varying angles of the surface material from which the plane wing is constructed.

In conforming to the upper and lower inside surfaces of the wings it is necessary specially to cut the contour of the entire edge length, giving different curves or shapes to the top and bottom contour lines of the ribs or vanes and at the same time progressively to alter the angle which from point to point the edge faces of the ribs make with the flat side surfaces of the ribs.

The ribs differ greatly in edge contours moreover at opposite edges, in widths and in angular relation at opposite edges, each edge to the flat sides at different distances from the tips of the wings and at different widths of wing. There is no recognizable relation along the lengths of the ribs in the angles which their edge faces present at any given distance along the rib lengths with respect to the flat side surfaces of the sheets of metal from which these ribs are cut.

In use for cutting these ribs or vanes my invention provides guides for a cutting tool which trims the edge faces of the ribs while the ribs are slid over the flat surface of a table to support one flat surface of each rib.

Describing first the structure shown in Figures 1 to 8:

Any suitable table, stand or frame 20 presents a plane face or top 21 which acts as a guide and upon which the work is slid to bring it into engagement with a rotary cutter 22 upon shaft 23 (Figure 3) which is driven by a motor 24 of any suitable type.

The motor is supported to swing about bearings 25, 26 (Figure 2), which are adjustable in height in order that the height above the table of the axis about which the motor (and hence cutting tool) swings may be made equal to the height of one of the surfaces of the work which is being cut. The adjustment may be secured by altering the number or size of liners 27 beneath suitable bearing blocks.

The central part of the table is recessed at 28 to give room for the motor to swing throughout the rather narrow range which is required and for the cutting tool to extend through the table. A dome 29, rotatable with the shaft, covers the upper part of the motor to protect against chips, oil, etc., getting into the motor.

Instead of the bearing blocks and bearings above the table to provide an adjustable axis above the table, about which axis the motor, its shaft and cutter swing, I may provide the same axis position and corresponding adjustment of axis height above the table without having any projection above the table. This is shown fragmentarily in Figure 1a, in which the motor is supported by posts 30 rigid with the table fitting into holes 31 in arcuate brackets 32, one on each side of the motor. The arcs center at the intended axis.

The posts fit within the holes to different depths and are held in adjusted position there by set screws 33. The motor is secured to curved supporting guides 34 which fit upon and slide along the arcuate brackets and have their centers of curvature above the table.

By the arcuate bracket guide construction equally with the construction of Figure 1 the motor with its shaft and cutter may be mounted to swing about an axis adjustable in height located above the table but with a clear tabletop not available in Figure 1.

In the form shown in Figures 1–6 the motor is hung from the bearings by bands or straps 35 and 36 on opposite sides of the motor so that the motor may be made to swing parallel to the planes of the paper in Figure 1, about the axis defined by the adjustment position of the bearings.

It will be obvious that the support of the motor in bearings may be varied greatly, and that whatever form they take the bearings may be either trunnion bearings or bearings which are capable of serving the same purpose as trunnion bearings.

The adjustment of the bearing in practical work is made so that the axis of the bearing passes through one of the flat surfaces of the work 37, the upper surface as illustrated in Figure 1, where the side surface forms an angular edge at 38 with the edge face 39 left by the cutting tool, or the lower surface where this lower surface forms an angular edge 38 with the edge face 38' left by this cut.

If the axis about which the rotary cutting tool is to tilt be placed in the upper plane work surface—as preferred—it will evidently require bearing height adjustment for each change in thickness of work pieces cut.

I contemplate and prefer using the flat surface 21 of the work table as a plane along which to slide an under flat surface 41 of each work piece in turn while manually pushing the work blank in a guided path against and past a rotary cutting or milling tool. The tool finishes the edge being cut, taking off a "trim" 42 and, so far as that edge is concerned, changing a blank into a finished work piece. In present practice each edge requires but a single cut and the guiding act requires not only a contouring guide 43 to define a path of feed but a limiting surface or abutment 44 against which the guide is pressed.

The contouring guide 43 for distinction is called a profiling guide or profile plate. A second guide is used which determines the angle of tilt of the cutting axis and for distinction it is called a "track" whether its plane of variation be horizontal, vertical or between these.

In order to give free cutting space above the work piece I provide a spacer 46. Two of these parts, the profile plate and track are needed concurrently and progressively and the spacer separates both of them from the work piece. I therefore mount all three removably upon the work.

Upon the work I mount in Figures 1, 3 and 8 first the spacer, then the profile plate 43 with its guiding contour laterally projecting so that it can engage the abutment, and finally the track 45.

The profile plate, track and spacer are permanently fastened together by rivets 47 and move with the work piece as a unit. The fastening to the work is temporary and readily replaceable, as is shown, as by dowel pins 48, 49 fitting in holes 50 within the work.

Additional rivets 47' are used to secure the profile plate 43 to the spacer 46.

The pattern contours, both profile and track, differ for the same reason that the ribs differ and a different profile plate and track is used for each of the opposite edge faces of any individual rib. As mounted there is a space 51 between the work and the profile plate, into which the upper part 52 of the cutter extends.

In order to avoid danger of making wrong assemblages of the patterns for the unit a different pattern unit would be used for each rib edge face of each different rib even if, as is not likely, two profile plates or two tracks proved to be alike.

A pattern unit is shown in Figures 3 and 8 in which the profile plate has a profile guiding edge or contour 43', let us say, which corresponds with the convex edge cut at 53 (Figure 7) of a rib which in Figures 3 and 8 is being cut out of a work strip 37 previously roughly fashioned to provide extra material at the convex and concave borders of the work piece.

The cutter 22 is shown in Figures 6 and 8 as cutting the extra trim material 42 and as having cut from the blank this material which lies on the other side of the cutter from the observer. There is not, or in any event need not be, any departure of part of the profile contour from the perpendicular.

In different views various forms of tracks are illustrated and described. It is to be noted that the track contour differs from the ultimate cut contour. The track variation bears no relation to the edge outline produced but controls the angle of edge face slope in the finished product.

Describing the track shown in Figures 1 and 8, a vertically facing track 45 is shown having its upper operating face 54 of various heights. In the illustration it is highest at the nearer end 55, slopes downwardly nearly uniformly to 56 and slopes generally downwardly but at different pitches at 57, 58, 59 and 60.

The cutting movement of the pattern unit and the work blank carried by it may be in either direction.

For convenience the track 45 is supported from the profile plate upon a flange. This makes it convenient to form the track from angle iron, one of whose flange edges is cut to the height variation required for the particular rib edge face being cut.

In Figure 1 the track passes under a roller 61, lifting the roller and/or allowing it to lower. The roller is carried by one arm 62 of a rocker arm 63 pivotally supported at 64 in a bracket 65. The second arm 66 of the rocker arm is connected to the motor by a link 67 and yoke 68. The yoke is suspended from the bearings by supports 34. The rocker arm is retracted to keep the roller pressing against the track by a spring 69 anchored at any suitable fixed point 70. The link fits different holes 71 in plate 72 so as to permit variation in the throw.

The profile plate contour and the track contour are so related that at any point the height of track at any particular point corresponds in the slope given to the edge face of the work to the slope required at that part of the length of the work piece. There need be, and ordinarily is not, any relation between the profile and the slope of edge face intended and their independence continues throughout the length of the cut.

The unit resting upon the table, and comprising the work piece, spacer, profile plate and track in Figure 3, is moved along the surface of the table by handles 73 and 74 in order to cause the edge face which is to be cut to pass and be cut by the rotary cutter. Since the profile guide as stated needs a fixed guide against which the profiling plate will react to perform its guiding function and at the same time to limit the depth of cut of the tool during the sweep of the feed, I provide such a guide by a tube 75 whose nose 76 extends down below the profile plate and just above and in line with the cutting edge.

In setting the plate the guiding edge of the plate is set so as to engage the fixed guide when the tool is cutting along the intended final contour.

The tube is supported from the table through a bracket 77, and supports a liquid-feeding block 78 whose feeding passages 79 are supplied with a suitable water soluble oil or other proper cutting lubricant by a drip cup 80. The liquid falls upon a holder 81 for a brush 82 by which the liquid is distributed at the cutting edge.

Looking at it from a slightly different standpoint than above, the profiling plate may be set by suitable positioning of the dowels and openings so that the cut when taken not only duplicates the contour of the profile but cuts to the proper depth into the work so as to give the exact finished contour line which is desired.

In the form shown in Figure 9 the same arrangement is used as in Figure 1 except that the track 45' may be turned to face laterally, facing toward the left in Figures 9, 10 and 11 so that the fixed guide will not interfere with convenient location of the follower wheel, 61. Retraction of bell crank or rocker arm is by a spring 69' connected from the lower part of the motor to the frame.

For reasons of simplicity applicant prefers the vertically facing form of track as the means of automatically changing the cutting angle. This is shown in the track face 54 having variant heights at 55 to 60.

Applicant recognizes that the same effect can be secured by a track whose face does not vary in vertical height, or which does not face upwardly. Such a track face 54', $54^2$ is shown at the opposite angular extreme, namely facing horizontally in Figures 9, 10 and 11, the extent of horizontal projection of its track contour being varied from point to point according to the angle of intended cut.

Figure 9 shows the horizontally facing track edge face 54' as carried by a separate plate 45' whereas Figures 10 and 11 show a horizontally facing track edge $45^2$ upon the rear edge face of the same pattern plate as carries the profile contour face or guide on its front edge face.

In Figure 9 the separate track is engaged by a roller 61' similar to the roller 61 seen in Figure 3, the difference being that the roller 61' is part of a horizontally sliding rod 83, supported, guided and kept from turning by bearings or guides 84, which are supported by suitable brackets 77', $77^2$. The horizontally sliding rod 83 is pivotally connected with one rocker arm 85 of a lever pivoted at 86 upon a bracket 87. The other rocker arm 88 is connected to the motor by a link 89. The motor is pulled to the left by a spring 69'.

The spring 69' is sufficient to keep the link 67 under tension and to keep the rod 83 under tension as distinguished from the compressive effects upon the thrust rod 67 and the swinging action of arm 63 in Figure 1.

In Figure 10 the track face 54' is engaged by a roller 61' upon a rod 83' sliding within bearing 84' to rock arm 85' about pivot point 86' in bracket 87 so as to push thrust rod 89 by means of lever end 88. The spring $69^2$ pulls the motor to the left as does spring 69' in Figure 9.

In each of the cases the antifriction wheel 61 is pressed against the track.

One feature that should be pointed out in Figures 9, 10 and 11 is that where either the separate plate of Figure 9 or the same plate as carries the profile contour plate faces horizontally, there must be care to prevent horizontal movement of the work carrying unit from resulting in additional tilting of the motor as compared with the motor tilt intended to be caused by the track variations. In both the separate plate form and the plate common to both profile and track faces the same means is used, namely that shown in Figure 10.

In Figure 10 the profile variation is shown at the right of the plate at 43'. A corresponding profile contour 43² is plotted as a construction line adjacent the track outline 54', the distance between the lines 43² and 43' being equal measured across the flat width of the plate; and the variation in track contour must be measured, also across the flat surface of the plate, between this line 43² and the track face 54' or 54² at each point throughout the length of the contour. At any point at which the profile contour is being cut the position of roller 61 and slide 83 will differ as compared with any other point on the track only as represents the difference in distance of the track 54' or 54² and construction line 43² between these two points. In other words the track position representing the track variation for the angle at two particular points such as 55 and 59, Figure 8 for example, in that at point 59' the position will correspond with that, let us say, at 90 between the arrows 91 and 92, but at 55' the position will correspond to that at 93 between arrows 94 and 95.

In Figures 9, 10 and 11 the right hand (profile) edge outlines the profile for the blank and the left hand edge track face 54' or 54² corresponds to the track, in that relative variations correspond with variant slopes or angles which the cut at these respective points presents with respect to a vertical line through the profile edge. The spring draws or pushes the track roller against the track.

It will be clear that if the axis of tilt be adjusted to lie in that face of the work farther from the work table face, the upper edge of the edge face cut will be true to the contour described by the profiling guide, whereas, if the tilting axis of the motor lie in the lower angular edge made by the lower face of the work with the edge face cut, it will be the lower face edge of the work which will agree in contour with the profiling guide. It would thus be possible to make any part of the thickness of the work agree in contour with the profiling guide merely by placing the tilting axis at a corresponding height in the work and in the edge face cut.

The extent of variation of the angle of the edge face from point to point may be adjusted somewhat by any adjustment in the length of throw of the thrust rod or link by which the rocker arm connects with the motor.

The work pieces are considered as of sheet material having parallel flat faces such as seen in Figure 7. In order to point out that my invention is independent of this feature I have shown in Figure 7ª supposititous work piece having irregular thickness and rough lower surface. This illustration is for the purpose primarily of indicating that work of such a character can be handled notwithstanding the irregularity of surface, by the expedient merely of providing a plaster or other temporary lower flat surface upon which the work may be slid upon a table surface.

It will be evident that any suitable form of rotary cutter is used. It is shown as having a cutting edge parallel with its axis of the motor shaft, and would not be tapered unless there were some special reason for desiring to provide part of the angle of cut with respect to the perpendicular in the cutter so as not to require so large an angular swing of the motor and motor shaft.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:

1. In a machine for cutting surfaces to variant contours and at variant angles with adjoining surfaces, a flat table, a tiltable rotary cutting tool having an axis, adapted to cut a profile above the surface of the table, a fixed guide, a profile guide movable with the work over the table surface and engaging the fixed guide to determine the profile and depth of cut in the work, a track carried by the work having variant contour, varying with the intended angle of tilt of the cutting tool and a tilting follower cooperating with the track to tilt the cutting tool axis.

2. In a machine for cutting surfaces to variant contours and at variant angles with adjoining surfaces, a flat table, a tiltable rotary cutting tool having an axis, adapted to cut a profile above the surface of the table, a fixed guide, a profile guide movable with the work over the table surface and engaging the fixed guide to determine the profile and depth of cut in the work, a spacer secured to the profile guide and temporarily secured to the work, a track carried by the work having variant contour, varying with the intended angle of tilt of the cutting tool and a tilting follower cooperating with the track to tilt the cutting tool axis.

3. In a machine for cutting surfaces at variant contours and angles with respect to the body of the work, a flat table over which the work is advanced by hand, a tiltable rotary cutting tool having an axis, adapted to cut a profile above the surface of the table, a profile guide carried by the work and adapted to determine the depth of cut of the cutting tool, a fixed guide engaged by the profile guide, a track guide fixed to the work and having contour variations determining the extent of tilt of the cutting tool and a tilting guide connected with the cutting tool, engaged by the track guide and progressively determining the angle of axis of the cutting tool as the work is progressed upon the table.

4. In a machine for cutting surfaces at variant angles with respect to the work, a table, a tiltable rotary cutting tool adapted to cut a contour at a level above the surface of the table, a profile guide to determine the contour of the cut, a fixed guide with which the profile guide cooperates to determine the path of the cut and the depth of cut in the work, a spacer secured to the profile guide, temporary mounting means for the profile guide and spacer, with respect to the work cut, a track mounted to travel with the work, spacer and profile guide and having a variant track path proportionate in the variation to the intended tilt of the cutter at different distances along the contour cut, and a tilting follower and connections between the track path and the tiltable cutting tool, tilting the cutting tool and lubrication for the cutting of the tool carried by the fixed guide.

5. In mechanism for cutting a contour on work at variant angles at different parts of the contour cut, an axially tiltable rotary cutting tool, means for rotating the tool, a fixed guide above the cutting tool, a mount for the cutting tool permitting tilting of the tool, a profile guide adapted to cooperate with the fixed guide and supported upon the work to travel with it, a track also supported on the work and having variations in track surface according to the angles to which the cutting tool is to be tilted, tilting connections between the track and the cutting tool mount whereby, as the contour of the work is being cut the cutting tool is tilted and the angle of cut is varied in accordance with the variation in surface of the track and means for lifting or lowering the position of the axis of tilting of the cutting tool.

NEWBY O. BRANTLY.

REFERENCES CITED

The following references are of record in the file of this patent:

UNITED STATES PATENTS

| Number | Name | Date |
| --- | --- | --- |
| 1,284,563 | Beecroft | Nov. 12, 1918 |
| 1,829,393 | Carter | Oct. 27, 1931 |
| 2,006,121 | Tham | June 25, 1935 |
| 2,230,292 | Faso | Feb. 4, 1941 |
| 2,311,216 | Duffy | Feb. 16, 1943 |

FOREIGN PATENTS

| Number | Country | Date |
| --- | --- | --- |
| 117,175 | Great Britain | July 11, 1918 |